United States Patent Office 3,098,755
Patented July 23, 1963

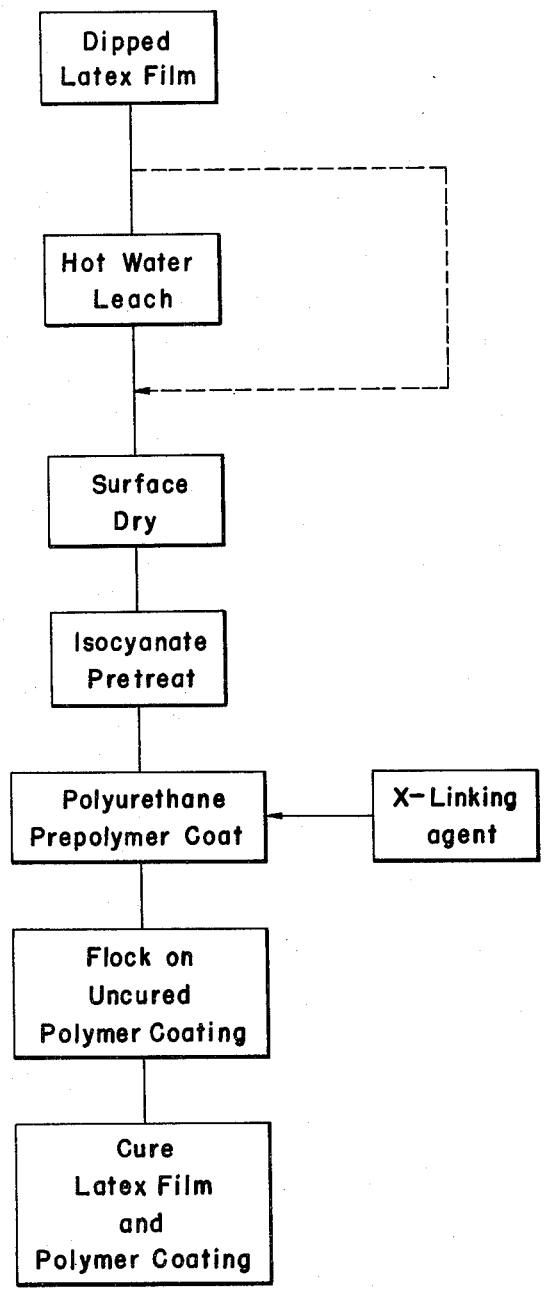

3,098,755
COATED RUBBER ARTICLES AND METHOD
OF PRODUCING SAME
Harry J. Barth and Philip T. Gay, Dover, Del., assignors to International Latex Corporation, Dover, Del., a corporation of Delaware
Filed June 29, 1959, Ser. No. 823,617
14 Claims. (Cl. 117—33)

This invention relates to deposited latex rubber articles having adherent coatings of elastomeric polyurethanes, and to methods for producing such coatings. In addition, the invention relates to latex rubber dipped goods provided with adherent coatings of elastic polyurethanes and a layer of flock adhesively secured to the polyurethane coatings.

Many articles made of films of deposited latex rubber, for example, girdles, gloves, swim suits, bathing caps, sheetings, overshoes, are exposed to conditions which tend to degrade the rubber and shorten the service life of the goods. Abrasion, aging, oxidation, attack by ozone, body oils, and other oils or greases have a deteriorating effect. Consequently, protective coatings on such exposed latex films which would prolong the service life of articles containing the same are highly desirable. However, difficulty has been encountered in providing coatings which have the requisite protective properties and which are adherent and possess sufficient elasticity to avoid breaking and/or delamination when flexed and stretched in service.

To obtain the advantages of the elastic latex rubber, while eliminating objections to the rubbery feel, e.g., skin contact and their non-absorbent property, such rubber articles are often provided with a flock lining of natural or synthetic fibers on one or both sides. However, improvement in flock retention is highly desirable whether flocking directly on the latex or using flock adhesives.

The provision of a combined protective coating and a good flock adhesive which would cure to an adherent film on the latex rubber base film appeared to be available in the form of polymeric polyurethanes. The resistance of such polymers to abrasion, ozone and oil would provide desired protection and these polymers could act as a good flock adhesive through chemical bonding with the flock. It was thought intermediate polyurethane polymers, i.e., "prepolymers," deposited as a coating on the uncured rubber base film could advantageously be cross-linked or cured to an elastic film while curing the rubber substrate with or without intervening flock deposition. Attempts to do so resulted in poor cures of the polymer coating which remained soft or tacky, and generally resulted in lack of adhesion and delamination of the coating film from the rubber substrate. Even where delamination did not occur, adhesion to the rubber base film was insufficient to meet tests established for in-service requirements.

The prepolymers or intermediate polymers were of the isocyanate-modified polyester type having terminal isocyanate groups using polyhydric alcohols or alcohol-amines as curing agents with or without catalysts. On the other hand, the same prepolymer cross-linked or cured in like manner when cast on a support and then stripped provided well cured elastic films having good physical properties, similar to those of the latex substrate, as exemplified by the following: Tensile–5000 p.s.i., 300% modulus— 250 p.s.i., elongation—550%, percent set 1, and tear 87–110. In addition, excellent adhesion of such films to other surfaces, e.g., metal, was obtained.

Apparently, the rubber film was inhibiting the polymer cure and preventing good adhesion. As is well-known, latex rubber films are usually fabricated by dipping a suitable form into aqueous dispersions of rubber. These dispersions contain emulsifying agents, stabilizers, and curing system components, such as accelerators and vulcanizers for subsequent curing. In addition, coagulants are often utilized for film thickness control in different portions of the shaped article being fabricated. The rubber film in the uncured condition, has a high moisture content, and either cured or uncured has occluded therein and adsorbed on its surface quantities of the above-mentioned ingredients.

Although it is not intended to limit the invention to any particular mechanism or theory of action, it is noteworthy that the free isocyanate groups present in the isocyanate-terminated prepolymers are highly reactive both to water and to any other active hydrogen-containing materials. Water, even though capable of causing cross-linking of isocyanate-terminated linear polymers, if available in excess amount, can prevent cure, and the extraneous matter present in the rubber latex film includes active hydrogen-containing materials. Thus, being isocyanate-reactive, it was thought they may contribute to the observed inability to obtain proper cure adhesion of the polyurethane coatings.

It was discovered according to the present invention that adherent and well-cured or substantially tack-free polyurethane elastomer coatings were obtainable by a method of surface treatment of the rubber base film to render it substantially non-inhibiting with respect to polyurethane polymer cure and adhesion. The treatment reduces the quantity of extraneous material on the rubber surface. Whether this reduces undesirable prepolymer isocyanate group reaction is not definitely established, but it provides good cure of the polyurethane coating, and excellent adhesion.

The invention advantageously provides articles comprised of latex rubber films having a surface pretreated to a non-inhibiting condition with respect to polyurethane polymer cure, that is, a surface of reduced extraneous matter content, the treated surface having an adherent coating of an elastomeric polyurethane which is an isocyanate-terminated reaction product of a polyester or polyglycol and an organic diisocyanate cured to an elastomeric state in the presence of a non-aqueous cross-linking agent, preferably selected from the group consisting of polyols and polyamines, and the rubber substrate preferably having been cured with the polymer after coating.

The invention also provides articles comprised of latex rubber films, as above described, containing a superposed flock layer firmly adhered to the surface of polyurethane polymer coating. The flock is applied to the prepolymer coating on the rubber base film after sufficient removal of solvent from the coating to impart proper consistency for flock adhesion without penetration of flock through the coating layer. The flocked polymer coating is then cured to an elastomeric state.

It was discovered that improved cure and adhesion were obtained by subjecting the uncured latex rubber base film to a water leach or soak prior to prepolymer coating. Only a surface drying and not a dehydration of the rubber film sufficed after the leach and before application of the prepolymer, preferably in solution form. This result is surprising, since it would have been expected that a water leach of the substrate without subsequent dehydration would cause reaction of water with the prepolymer isocyanate groups and prevent proper cure and/or adhesion of the polymer. Whether the improvement is due to effective reduction of isocyanate-reactive extraneous matter from the surface of the rubber film is not definitely established. However, the fact remains that improved cure and adhesion were obtained by this water leach pretreatment of the substrate as compared to untreated latex rubber films.

It also was found that further improvement in polymer cure and excellent adhesion were obtained when the uncured rubber substrate was treated with low molecular weight isocyanate-containing material before coating with the prepolymer. This pretreatment may be in lieu of the water leaching, but preferably is used in conjunction with and subsequent to the water leaching.

The method of the invention for the production of deposited latex rubber films having firmly cured adherent polyurethane polymer coatings therefore comprises applying an isocyanate to either or both sides of the base film or substrate surfaces, preferably with a precedent leach or soak of the substrate in hot water followed by surface drying, coating the thus-treated substrate with an isocyanate-terminated polyester or polyether glycol prepolymer, preferably in a suitable solvent, reacting the prepolymer with a cross-linking agent which is a polyfunctional isocyanate group-reactive substance of the class consisting of polyols and polyamines, preferably the former, and curing of the prepolymer, preferably by accelerated curing at elevated temperature under conditions which also cure the rubber substrate, and which advantageously correspond to normal curing conditions for the latex rubber. In addition, where an adherent flock layer is desired, the prepolymer solvent is substantially removed from the coating and flock is applied by any suitable methods, such as, mechanically or electrostatically. The flock is impinged onto the coating in such a way that mixing of the flock fibers with the polymer or embedding of the fibers or full penetration thereof into the polymer coating is avoided. Thus, whether oriented normal to the coating surface or not, the fibers are engaged only by the upper or surface portion of the coating.

In connection with the excellent results of flock pick-up and retention observed in the practice of the present invention, it should be noted that at least the outer layers of the polymer coating provide reactive isocyanate groups which are capable of chemically bonding with active hydrogens of the flock material whether it be of cellulosic origin, either natural, such as cotton fiber, or synthetic such as rayon, cellulose acetate, or non-cellulosic, such as polyamide (nylon), polyester (Dacron), acrylic and others. This chemical bonding combined with the mechanical interlock of the fibers in the surface of the coating film provides an improved flock retention.

The prepolymers suitable in the practice of the invention may be those which upon reaction with a suitable cross-linking agent will form elastomeric polyurethane polymers having physical properties sufficiently similar to those of the latex rubber substrate as to insure avoidance of failure of the polymer coating upon subjecting the substrate to repeated flexing and stretching within the limits of its ultimate elongation. In this regard, those polyurethane polymers which in cured unsupported films exhibit ultimate elongations not substantially less than about one-half that of the rubber substrate and 300% moduli not substantially greater than about three times that of the vulcanized latex rubber film are productive of the most desirable results. However, any polyurethane polymer may be employed which is firmly cured and adhesively bonded to the rubber substrate by the practice of the invention.

The polyurethane prepolymers may be suitably produced from linear polyesters prepared by reacting polyhydric alcohols, for example, ethylene and propylene glycols or mixtures thereof with polycarboxylic acids, for example, aliphatic dicarboxylic acids, such as adipic, pimelic, sebacic, methyl adipic and succinic acids, using an excess of the alcohol over the acid so that the resulting linear polyester contains terminal hydroxyl groups. Polyesters having molecular weights of at least 1100, hydroxyl numbers of not more than 100, and low acid numbers, e.g. below 2 are preferred. The polyester is then reacted with an excess of any suitable diisocyanate, for example, an aromatic diisocyanate, such as 1,4-toluene diisocyanate; naphthalene-1,5-diisocyanate; p,p′-diphenylmethane diisocyanate, and also aliphatic diisocyanates, such as, hexamethylene diisocyanate, to insure the presence of free isocyanate groups in the prepolymer, that is, an isocyanate-terminated polyester. Such polyesters are capable of subsequent reaction with polyfunctional cross-linking agents, such as, di- and other polyhydroxy compounds, and di- or other polyamines with and without catalysts, such as those of the tertiary amine type. Such reactions extend the linear chain and cross-link the polymer to an elastomeric state when the proper proportioning of the prepolymer and curing agent is observed.

Prepolymers suitable in practicing the invention may also be made from polyalkyleneether glycols, commonly referred to as polyethers, which like the hydroxy polyesters are reactable with diisocyanates to provide diisocyanate modified, that is, isocyanate-terminated polyalkyleneethers. These in turn may be cross-linked to elastomeric polyurethanes through reaction with polyols, such as di- and polyhydric alcohols of various types well known in this art, or with polyamines. Polyethylene glycols, polypropylene glycols, and other polyethers, such as polytetra methylene ether glycol may be mentioned as illustrative. Other polymeric glycols are suitable, such as polyalkylenethioether glycols, and polyalkylene-aryleneether glycols and thioether glycols. The polymeric glycols may have a widely varying molecular weight provided they are elastomeric and have physical properties as above-described.

The isocyanate-terminated prepolymers may advantageously be blocked or capped, that is, the terminal isocyanate groups may be reacted to stabilize the prepolymer against premature cure by atmospheric moisture. The capping agent may be any active hydrogen substance which may be volatilized or removed upon regeneration to free the isocyanate groups at temperatures below that adverse to the rubber substrate and which will not degrade the rubber substrate. Preferably, these isocyanate percursors should be decomposable at temperatures of not over about 250 to 300° F., preferably 200 to 275° F. Examples of such blocking agents are diethyl malonate, acetoacetate and acetylacetone, and sodium bisulfite.

The process of the invention advantageously permits preparation of the latex rubber film by conventional dipping processes either with or without control of thickness in the deposited layers by coagulant utilization. In practice it is preferred to reduce the total thickness of the base film in an amount approximately corresponding to the thickness of the polyurethane polymer coating. In general, shaped latex articles made by dipping have film thicknesses which may range from on the order of one or two hundredths of an inch up to a few tenths of an inch. Typical polyurethane polymer coating thicknesses are from .001 to .005 inch.

It is a particular advantage of the present invention that the rubber substrate need not be vulcanized or cured prior to the application of the polyurethane coating, and conversely the polyurethane coating need not be cured prior to curing the rubber substrate. The invention advantageously permits curing of both the base film and the coating at substantially the same time and under the same conditions. Any rubbery substrate suitable for dipped goods is suitable in the practice of the invention, such as natural and synthetic rubber and mixtures of the two. Among suitable synthetic rubbers may be mentioned butadiene-styrene (GRS), butadiene-acrylonitrile (Buna), butadiene-carboxylic elastomers, synthetic isoprene, butyl rubber and polysulfide rubber, and other elastomeric polymers.

The pretreatment of the substrate by water leaching is most simply conducted by immersion in water with or without agitation. The time of treatment may be from at least 10 minutes up to several hours, and preferably about a half hour with the temperature from above 100° F. to the atmospheric boiling point, preferably about 150 to 160° F. After removal from the water soak, the substrate is subjected to conditions which will provide a visibly dry surface, such as warm air drying for several minutes, or room temperature drying for a correspondingly longer time.

The rubber film is then subjected to treatment with an isocyanate, preferably in solution in a volatile solvent. This isocyanate treatment is conducted preferably by dipping, although spraying of the solution onto the surface of the article or any other suitable method of contacting the surface of base film with the solution may be practiced. The isocyanate utilized is preferably a diisocyanate, for example, 2,4-toluene diisocyanate, or isomers or mixtures thereof, p,p'-diphenylmethane diisocyanate and also other aromatic or aliphatic isocyanates such as those previously mentioned.

Any suitable solvent, preferably volatile, non-flammable and of low toxicity may be utilized. Chlorinated solvents, such as perchloroethylene, trichloroethylene and monochloro benzene are particularly satisfactory. The solvent, of course, should be non-reactive relative to the isocyanate and preferably has little or no effect upon the rubber substrate. In those instances where the solvent has a swelling action on the rubber, the time of immersion is limited such that any noticeable swelling is avoided. It has been determined that the concentration of isocyanate is preferably relatively low in order to avoid adverse effect of the isocyanate on the modulus of the rubber and therefore solutions of substantially higher than 10% by weight of isocyanate are usually not employed. Advantageously preferred concentrations are as low as about 5%, and even lower concentrations, e.g., 1% have been used.

Although diisocyanates provide best results in the pretreatment of the substrate, other polyisocyanates, such as triisocyanate and even relatively low molecular weight organic solvent-soluble isocyanate polymers, and also monoisocyanates may be used. However, with the monofunctional compounds larger quantities are required, and it is not as economical in order to obtain equivalent results.

The isocyanate-terminated prepolymer is preferably applied to the coating in solution form, although liquid polymers, if of sufficiently low viscosity are usable. Where the prepolymer is not blocked or capped, the usual precautions for maintaining the prepolymer in a dry environment are exercised, and generally the prepolymer solution should be utilized for coating not more than about 24 hours after preparation.

The prepolymer may be applied either by spraying or dipping, or any other suitable manner of application which will impart a polymer coating of relatively uniform thickness and which will result in complete coverage of the pretreated substrate. The thickness of the coating may be controlled by variation in viscosity of the prepolymer solution, which in turn is generally determined by the prepolymer solids content. For spraying applications lower viscosities, for example, 60 to 100 centipoises are recommended, while for dipping applications the solids content may be varied appreciably, although it has been observed viscosities above 400 centipoises may tend to cause bubble entrainment in the coating, and viscosities on the order of 100 to 200 centipoises are recommended.

Any solvents which are non-reactive with the prepolymer and which after application will substantially completely volatilize from the surface, preferably without heat or vacuum, may be utilized. Among those which may be mentioned are methyl, ethyl and butyl cellosolve acetate, which are preferred, and other dihydric alcohol aliphatic acid ether-esters, n-butyl acetate, ethyl acetate, diethyl sulfate, butyl carbitol acetate and other ether-esters of diethylene glycol, and, in addition, more volatile solvents, such as methylene chloride, and ordinary aromatic solvents, such as toluene and benzene, may be satisfactorily utilized.

Most satisfactory results have been obtained when the curing or cross-linking agent is mixed with the prepolymer solution before coating. Polyhydroxy curing agents are preferred over polyamines, since they are generally somewhat less reactive and this is advantageous when flock is deposited before curing the prepolymer. Particularly effective polyols with tertiary amino groups, such as triisopropanolamine, since the tertiary amine group acts as a "built in" catalyst. In most instances, the curing agent may be added to the prepolymer solution as a separately prepared solution in the same or compatible solvent, but it may also be applied separately either before and/or after application of the prepolymer coating.

As is known, the cross-linking agent must be proportioned on the basis of the isocyanate group content of the prepolymer. The isocyanate to hydroxyl or amino group ratio should be regulated to provide at least a stoichiometric amount of isocyanate groups. For example, the ratio expressed as "NCO/OH" should be equal to or greater than 1, preferably at least 1.1 and less than 2, with best results being obtained when the ratio is between 1.1 and 1.5. It is desirable to avoid such isocyanate excess as will cause the cure to be essentially through the medium of subsequent reaction with moisture, rather than reaction with the added polyol.

After coating, the prepolymer solvent is permitted to substantially evaporate, usually accelerated by mild heating, before the flock layer is deposited on the surface of the polymer coating. This aids in preventing large reductions in polymer film physical properties, such as tensile and elongation by flock penetration or embedding of the flock in the polymer film. Rupture of the elastomeric polymer coating due to the formation of a fiber network in the polymer film is thus avoided by restricting the flock deposition to the surface or upper portion of the polymer film.

The flock is deposited upon the polymer coating in any suitable manner, such as by blowing or preferably by electrostatic deposition. In any case, the flocking is conducted in such a manner that the fibers are either oriented with their ends normal to the coating surface, or are projected with such a force that they are embedded only in the surface of the coating layer and do not penetrate through the coating.

The flock may be of any type, that is, natural or synthetic fibers of the cellulosic or non-cellulosic type. For example, cotton, alpha cellulose, cellulose acetate, rayon, polyamide (nylon), and polyester (Dacron) may be mentioned, and even animal fibers such as wool may be used as flock. By the term "flock," the dictionary sense is intended in that it denotes a fibrous material, the particles of which are elongated, e.g., generally cylindrical but of short longitudinal dimension compared to so-called staple fibers. Such flock fibers usually do not exceed about $1/10$ inch in length and may be either poly or mono filamentary.

After flocking, the article is subjected to curing conditions for the purpose of cross-linking both the polyurethane polymer coating and vulcanizing the rubber substrate. This is accomplished at elevated temperatures of from about 150 to 300° F. with curing times of from about 15 minutes or one-half hour up to as much as 24 hours. Usually shorter times are utilized at the higher temperatures. It has also been determined that for most consistently obtaining optimum cure and adhesion results, the curing is conducted without any appreciable delay after flocking. This curing may be accomplished with any suitable equipment, for example, hot air circulating ovens, infrared banks, or induction coils.

The following example is intended to provided a description of a complete specific embodiment of the invention in conjunction with the flowsheet shown in the attached drawings without constituting a limitation thereon.

EXAMPLE

Seamless girdles of natural rubber were prepared by conventional dipping of metal forms in rubber latex. The latex was a blend of 70% by weight (dray solids basis) of a centrifuged ammoniated natural rubber latex and 30% by weight of a cream concentrated ammoniated natural rubber latex stabilized with sodium salts of sulfate monoesters of lauryl and myristyl alcohols and sodium silicate with 2 parts sulfur, 2 parts ZnO, 5 parts titanium dioxide, 0.5 part zinc diethyldithiocarbamate, 0.75 part zinc salt of 2 mercaptobenzothiazole per 100 parts of dry rubber and 1 part of a standard antioxidant. The final dip in the latex provided a rubber substrate having a thickness of about 0.02 in the thinnest portions of the deposited film, and somewhat greater than 0.06 at the thickest portions of the film. The thickness was controlled in the initial and final dips by spraying a solution of calcium nitrate as a latex coagulant upon those areas in which the higher thicknesses were desired. The girdles on the forms were then dried for about 30 minutes at 150° F. and thereafter immersed in water at 150° F. for 30 minutes and dried in 10 minutes at 150° F. The girdles were then dipped in a 5% solution of 2,4-toluene diisocyanate in perchloroethylene, the solution being contained in a tank of suitable depth and of narrow cross section for minimum exposure of the reactive isocyanate to the atmosphere. The diisocyanate-pretreated girdles were then coated by spraying with a solution of prepolymer (an isocyanate-terminated prepolymer having an average molecular weight of 8400 prepared by reaction of 0.125 part of toluene diisocyanate with 1 part of a polyester in turn prepared by reaction of a mixture of ethylene and propylene glycol and adipic acid in proportions to yield a polyester polymer having a molecular weight range of from 2800 to 3800, an hydroxyl number of from 30 to 40, and an acid number of from 0 to 1.5). The prepolymer was prepared as a solution of 43% by weight total solids in ethyl Cellosolve acetate of which solids 41.3% was prepolymer and 1.7% was triisopropanolamine as the curing agent. The coating thickness was from about 0.002 to 0.004 inch. The polyurethane coated girdles were then oven dried for 10 minutes at 150° F. to volatilize a substantial part of the solvent and to form a continuous tacky adhesive film of polymer.

The girdles with the tacky polymer adhesive coating were then subjected to flocking with cotton flock by means of electrostatic deposition in which the forms carrying the girdles acted as ground and were passed between electrodes carrying voltages of about 30,000-60,000 volts of like polarity. The coated and flocked girdles were then subjected to curing for 60 minutes at 250° F. The girdles were stripped from the forms and processed to finished condition in a conventional manner.

Representative samples of the total production of girdles, as above exemplified, were subjected to tests with the physical properties of the flocked polyurethane coated rubber films being taken before and after each test. The properties measured were modulus at 300, 500 and 700% elongation, tensile, elongation, percent set, and tear.

Each girdle was subjected to severe conditions of soaking in a 2% solution of sodium carbonate for 45 minutes at 160° F. (a test for adhesion described in more detail below), followed by washing 10 cycles in an automatic washing machine to reproduce in service conditions. The girdles were inspected after the tests and no delamination of the flocked polyurethane coating had occurred and the physical properties were not adversely affected. The average physical properties for the girdles tested were as follows:

Table I

BEFORE SODA ASH AND WASH

| 300% | 500% | 700% | Tensile | Elongation | Percent set | Tear |
|------|------|------|---------|------------|-------------|------|
| 245  | 725  | 1,705 | 2,240  | 800%       | 8           | 332  |

AFTER SODA ASH AND WASH

| 300% | 500% | 700% | Tensile | Elongation | Percent set | Tear |
|------|------|------|---------|------------|-------------|------|
| 225  | 725  | 1,625 | 2,205  | 810%       | 8           | 343  |

The improved results of the invention in terms of polyurethane polymer cure and flock adhesion are further illustrated in conjunction with the comparative tests set forth below, which follow a brief explanation of the tests and the reason for their selection.

Ordinarily polyurethane polymer cure may best be determined by measurement of the physical properties of unsupported films of the polymer after exposure to curing conditions. However, experience showed that good cures and physical properties were obtained with the polymer films while the same polymers as coatings on uncured rubber base films gave both poor polymer film cures and poor adhesion of the polymer film and the flock layer deposited on its surface. As a result, the following qualitative and representative test methods were adopted for evaluating the polyurethane polymer coating on deposited latex rubber films:

(1) *Cure test.*—The coated substrate either flocked or unflocked is subjected to an oven cure cycle of 60 minutes at 250° F. Immediately after removal from the oven, the polymer film surface is scraped with the fingernail or the edge of a coin. A firm cure is indicated when one is not able to scrape the coating away from the latex substrate. A soft and unsatisfactory cure is exhibited when the skin of the coating breaks and slides under the scraping pressure revealing a tacky uncured undersurface.

(2) *Adhesion test.*—A correlation was found between polyurethane coated and flocked girdles which stood up in inservice tests, and those which withstood the soda ash test above-mentioned. Therefore, this latter test was taken as a proper criterion of satisfactory adhesion between the latex substrate and the polyurethane polymer coating. The adhesion test method is as follows: Soak the test sample in a 2% solution of sodium carbonate for 45 minutes at 160° F. Remove sample and immediately test for adhesion by scraping with a sharp object, e.g., fingernail or edge of coin, to determine whether the coating can be separated or peeled back from the latex substrate. Results are classified as follows:

Excellent adhesion—coating cannot be scraped from latex;
Good adhesion—coating can be scraped but only in the area to which the scraping force is actually applied;
Poor adhesion—coating peels away or delaminates from the substrate either during the soaking or is easily peeled away by scraping.

The improvement obtained by water leaching of the substrate prior to polymer coating is demonstrated by the following results set out in Table II. The tests are performed utilizing the materials and procedure set forth in the example above on test samples consisting of dipped latex films prepared on metal laboratory plates, except that no diisocyanate pretreatment of the substrate was included.

Table II
SUBSTRATE WATER LEACH

| Water soak | Cure | Soda ash adhesion test |
|---|---|---|
| None | Soft | Poor adhesion. |
| 30 minutes at 150° F | Firm | Good adhesion. |

In Table III below is shown the effect of the diisocyanate pretreatment uncured latex rubber films in terms of the cure and adhesion tests set forth above. The rubber films were prepared by dipping metal plates into latex using the materials and procedures as those set forth in the example above. The substrates were dried 10 minutes at 150° F. before diisocyanate treatment.

Table III
DIISOCYANATE PRETREATMENT

| Pretreat | Cure | Adhesion by Soda Ash Test |
|---|---|---|
| (1) None (not water leached) | Uncured, sticky. | Poor. |
| (2) Water leached 30 minutes at 150° F.—no diisocyanate. | Firm | No delamination or wrinkling but can be scraped off, good adhesion. |
| (3) Water leached 30 minutes at 150° F. and dipped in 5% Hylene TM (80/20 mixture of 2, 4 and 2, 6 toluene diisocyanate in perchloroethylene) | do | Very hard to scrape, excellent adhesion. |
| (4) Water leached 30 minutes at 150° F. and dipped in 2.5% Hylene M-50 p,p'-diphenylmethane diisocyanate in perchloroethylene | do | Do. |
| (5) No water leach—dipped in 5X Hylene TM in perchloroethylene | do | Hard to scrape, very good adhesion. |

It should be noted that the results of these qualitative tests as reported in the foregoing tables do not fully establish the sharp distinction and improvement provided by the invention. Visual examination is a better indication when such qualitative tests are utilized. It suffices to state that the pretreatment by water leaching and with isocyanate contributes the optimum and most consistent improvement, although the process may be conducted without the water leach if isocyanate treatment is used, or without isocyanate if a water leach is used. With no substrate treatment before application of the prepolymer coating the tests indicated poor cures with soft or sticky films and poor adhesion.

The invention also provides improved flock adhesion compared to latex films in which the flock is directly adhered to the latex substrate. Superior flock retention of the polyurethane-coated latex films is clearly demonstrated by tests performed in the following manner: Girdle films flocked directly on the latex substrate, and polyurethane coated girdle films prepared according to the invention, were subjected to the soda ash treatment above-described, and then to a single cycle in an automatic washer. The girdles after inspection were put through three additional washing cycles, and after inspection five additional washing cycles followed by drying for one hour at 150° F. The loss in weight sustained by the girdles during this testing was measured and found to be 51% greater for the girdles flocked directly onto the latex film compared to the girdles prepared with polyurethane coatings in accordance with the present invention. Visual inspection of the girdles at the various stages during the test and upon a total of 20 wash cycles clearly demonstrated the superior flock retention property of the girdles prepared according to the invention.

From the foregoing, it may be seen that by means of the present invention, improved cure and adhesion of polyurethane coatings may be obtained on uncured rubber substrates of any type of shaped article made by latex dipping or casting, and curing the coating and the substrate together. Of course, the invention may be utilized on precured substrates but its fullest advantages are obtained without curing the substrate prior to coating.

In practicing the invention, it has been found that utilizing blocked or capped prepolymers advantageously permits pigment loading of the intermediate polymer solution. This avoids the cure-inhibiting effect of reaction between polymer isocyanate groups and the residual moisture and impurities present in the pigments. Conventional amounts and types of pigments may be utilized, e.g., from a few percent up to 20% or more inorganic types, e.g., titanium dioxide, zinc oxide, and cadmium oxide, or organic, such as phthalocyanines, and other well known and commonly used coloring materials. The pigmented intermediate blocked polymer solution is coated on the latex film, and the polymer is unblocked preferably after drying of the pigmented coating, to free the isocyanate groups for reaction with the curing agent.

Although the effect of the water leaching and isocyanate treatment of the substrate prior to coating with the polyurethane polymer is not definitely understood, it suffices to state that improved results are amply demonstrated when practice of the present invention is utilized in comparison with no substrate pretreatment.

Various modifications may be made to the invention without departing from the spirit thereof, the scope of which is to be measured by the appended claims without limitation to specific embodiments heretofore set forth.

We claim:
1. A method of producing adherent elastomeric polyurethane coatings on deposited latex rubber substrates which comprises water leaching the uncured rubber surface, drying said water leached surface treating said leached surface with a solution of isocyanate, applying to said surface a coating of an isocyanate-terminated prepolymer selected from the group consisting of polyesters and polyethers, said prepolymers being curable to an elastomeric state, and curing the prepolymer with a non-aqueous cross-linking agent at a temperature and for a time sufficient also to cure the rubber substrate, the curing agent being present in amount to provide a ratio of NCO groups in the prepolymer to NCO-reactive groups in the cross-linking agent of at least 1 and less than 2.

2. A deposited latex rubber substrate having an adherent elastomeric polyurethane coating thereon produced by the method of claim 1.

3. A method according to claim 1 in which a flock layer is deposited on the surface of said prepolymer coating prior to curing the coating.

4. A deposited latex rubber substrate having an adherent elastomeric polyurethane coating thereon and a flock layer adhered to said coating produced by the method of claim 3.

5. A method of producing well-cured adherent polyurethane polymer coatings on deposited latex rubber substrates which comprises treating the uncured rubber surface with a solution of isocyanate, applying to said surface a coating of an isocaynate-terminated prepolymer selected from the group consisting of diisocyanate-modified polyesters and polyethers, said prepolymer being curable to an elastomeric state, and curing the prepolymer with a non-aqueous cross-linking agent at a temperature and for a time sufficient also to cure the rubber substrate, the curing agent being present in amount to provide a ratio of NCO groups in the prepolymer to NCO-reactive groups in the cross-linking agent of at least 1 and less than 2.

6. A deposited latex rubber substrate having an adherent elastomeric polyurethane coating thereon produced by the method of claim 5.

7. A method according to claim 5 in which a flock layer is deposited on the surface of prepolymer coating prior to curing the coating.

8. A deposited latex rubber substrate having an adherent elastomeric polyurethane coating thereon and a flock layer adhered to said coating produced by the method of claim 7.

9. A method according to claim 5 in which the prepolymer prior to curing has the free isocyanate groups blocked by reaction with a compound releasable by decomposition.

10. A method according to claim 9 in which the polyurethane polymer coating contains a pigment.

11. A deposited latex rubber substrate having an adherent elastomeric polyurethane coating thereon produced by the method of claim 9.

12. A method of producing dipped elastic articles of latex rubber having a substantially tack-free, well-cured adherent polyurethane polymer coating, which comprises forming a base rubber film by dipping a form in rubber latex, leaching the surface of the uncured rubber film in hot water, drying said water leached surface treating the leached surface after drying with a dilute solution of a diisocyanate, coating said leached treated surface with a volatile inert solvent solution of an intermediate diisocyanate-modified polyester polymer having terminal isocyanate groups and reactable to an elastomeric state, and curing said polymer coating in the presence of a polyhydric alcohol cross-linking agent in amount to provide an NCO/OH ratio between 1.1 and 1.5 at a temperature and for a time sufficient also to cure the rubber base film, and thereafter stripping said article from the form.

13. A method according to claim 12 of producing dipped elastic articles of latex rubber having a soft flock layer firmly adhered to said polyurethane polymer coating in which flock is applied to said intermediate polymer before curing.

14. A method according to claim 12 in which the polyhydric alcohol is a trihydroxy tertiary amine.

References Cited in the file of this patent

UNITED STATES PATENTS

| | | |
|---|---|---|
| 1,542,388 | Hopkinson et al. | June 16, 1925 |
| 2,169,492 | Clark et al. | Apr. 9, 1940 |
| 2,430,479 | Pratt et al. | Nov. 11, 1947 |
| 2,776,223 | Brown et al. | Jan. 1, 1957 |
| 2,784,630 | Koprow et al. | Mar. 12, 1957 |
| 2,852,413 | Tischbein | Sept. 16, 1958 |
| 2,874,068 | Van Spulak | Feb. 17, 1959 |

FOREIGN PATENTS

| | | |
|---|---|---|
| 712,053 | Great Britain | July 14, 1954 |
| 791,280 | Great Britain | Feb. 26, 1958 |

OTHER REFERENCES

"Isocyanates in Surface Coatings," in Paint Manufacture, December 1955, page 469 relied on.